United States Patent
Gabel et al.

(10) Patent No.: US 7,719,599 B2
(45) Date of Patent: *May 18, 2010

(54) ADAPTER FOR VIDEO CAMERA FOR PROVIDING DECREASED DEPTH OF FOCUS

(75) Inventors: Benjamin Gabel, Frankfurt (DE); Wolfgang Weigel, Ottobrunn (DE)

(73) Assignee: P&S Technik GmbH, Munich (DE)

( * ) Notice: Subject to any disclaimer, the term of this patent is extended or adjusted under 35 U.S.C. 154(b) by 867 days.

This patent is subject to a terminal disclaimer.

(21) Appl. No.: 11/473,679

(22) Filed: Jun. 23, 2006

(65) Prior Publication Data

US 2006/0238639 A1  Oct. 26, 2006

Related U.S. Application Data

(63) Continuation of application No. 10/469,295, filed on Aug. 28, 2003, now Pat. No. 7,092,025.

(30) Foreign Application Priority Data

| Feb. 28, 2001 | (DE) | ................................. 101 09 604 |
| Mar. 8, 2001 | (EP) | ................................. 01105364 |
| Feb. 27, 2002 | (WO) | ...................... PCT/EP02/02089 |

(51) Int. Cl.
  *H04N 5/225* (2006.01)
  *G02B 13/16* (2006.01)
  *G03B 17/00* (2006.01)
  *B60R 1/06* (2006.01)
(52) U.S. Cl. .......................... 348/335; 396/530; 359/508
(58) Field of Classification Search ................. 348/335, 348/360–361; 396/529, 530; 359/362, 443, 359/507, 508
See application file for complete search history.

(56) References Cited

U.S. PATENT DOCUMENTS

| 3,610,728 A | 10/1971 | Firth |
| 4,390,239 A | 6/1983 | Huber |
| 4,693,577 A | 9/1987 | Sasagaki |

(Continued)

FOREIGN PATENT DOCUMENTS

EP       0950912       10/1999

(Continued)

*Primary Examiner*—Kelly L Jerabek
(74) *Attorney, Agent, or Firm*—Invention Management Associates; Edward L. Kelley

(57) ABSTRACT

The invention relates to a method and apparatus for capturing a low depth of focus image with a video camera (10) by forming a first image of a scene, with a first image format size, onto a projection area (16), housed inside an adaptor, and forming another image of the scene, with a second smaller image format size onto a semiconductor sensor field (28), housed inside the video camera (10). The invention further relates to configuring the projection area (16) to prevent non-image characteristics of the projection area from being imaged in a disturbing manner onto the semiconductor sensor field (28). The projection area is either movable with respect to the first image or encapsulated by clear filter glass, or both to prevent the non-image characteristics from being imaged in a disturbing manner. The adaptor includes an adaptor housing (30') for attaching to the video camera (10) and the adaptor housing houses the projection area (16) and a first objective lens (12).

30 Claims, 2 Drawing Sheets

| U.S. PATENT DOCUMENTS | | | FOREIGN PATENT DOCUMENTS | | |
|---|---|---|---|---|---|
| 5,802,406 A | 9/1998 | Otaki | EP | 1014705 | 6/2000 |
| 6,697,115 B1 | 2/2004 | Amano | JP | 07-151946 | 6/1995 |
| 6,749,304 B2 | 6/2004 | Jacumet | WO | WO 0181995 | 4/2001 |

ADAPTER FOR VIDEO CAMERA FOR PROVIDING DECREASED DEPTH OF FOCUS

CROSS-REFERENCE TO RELATED APPLICATIONS

This application is a continuation of U.S. patent application Ser. No. 10/469,295, filed on Aug. 28, 2003, now U.S. Pat. No. 7,092,025 which is hereby incorporated by reference in its entirety. This application claims priority to PCT/EP02/02089, filed Feb. 27, 2002, to European Patent Application serial number, EP01105364.2, filed Mar. 8, 2001, and to German Patent Application serial number 10109604.8, filed Feb. 28, 2001.

BACKGROUND OF THE INVENTION

1. Field of the Invention

The present invention relates to a video camera including a camera housing, a first objective, through which light from a scene to be picked up is guidable into the camera housing, and a semiconductor sensor field, on which light from the scene to be picked up is able to be cumulated. It further relates to an adapter for a video camera, including an adapter housing and an objective, through which light from a scene to be picked up is guidable into the adapter housing.

2. Description of the Related Prior Art

The invention deals with the problem of depth of focus. Since video cameras exist, attempts are made to copy the "look" of a celluloid film picture. For the following three reasons, this fails: firstly, the resolution of film is currently still much higher than that of video. Secondly, the contrast range of film is substantially higher, and thirdly, the depth of focus of a 35 mm film is distinctly lower.

The last-mentioned reason may rather seem like a disadvantage for a layman, but in effect is exactly the opposite for an expert. Low depth of focus is of extraordinary importance especially in making cinema films. However, what is felt as especially "film-like", namely a quickly decreasing depth of focus, is not typical for all of the existing film formats at all. "Super 8" or "16 mm" are—due to the small imaging area—in the worst case well-focused like a video. However, also films on these formats are not yet felt as especially "film-like". The everyday perception of what is "film-like" is characterized by the continuous consumption of materials of the field of the 35 mm film: All of the Hollywood movies, all advertising films, all of the big video clips are still formed exclusively on this format. And this consumption has characterized the perception. For example, a "Tatort" filmed on a 16 mm film, will hardly be perceived as especially "film-like" by anyone. Each layman will note that the "X files" filmed on 35 mm film look somehow otherwise.

As already indicated, the depth of focus is critically influenced by the size of the recording area. A conventional 35 mm film negative is huge compared to the recording chip of a video camera. This size makes it possible that the depth of focus decreases. On the contrary, the video film-maker fails to achieve a desired lack of depth of focus due to the small area of the chip.

With regard to the fact that the resolution and the contrast of video cameras are almost daily improved, the lack of depth of focus is currently the unsolved problem of video cameras. From the company Canon it is known to place photo optics in front of a video camera by means of an adapter. However, this results in the chip being much too small with regard to the film optics, to show only a detail of the projected image. The effect arising thereby is that the focal length of the optics seems to extend. Optics representing a normal objective with respect to cameras, becomes a teleobjective on a video camera.

In order to obtain the same image detail on the small chip of the video camera, which is achieved by a film camera having any optics, unequally much more wide-angled optics have to be used (approximately 7-times). This is possible, however, the achieved lack of depth of focus is thereby lost, since this one is inseparably associated with the actual length of the focal length. Namely, it is true: the smaller the formed image and the shorter the focal length of the optics, which is required for imaging a certain image detail thereon, the larger the depth of focus.

Therefore, the present invention is based on the object of developing a video camera of the initially mentioned type such that achieving low depths of focus is made possible.

BRIEF SUMMARY OF THE INVENTION

According to the invention, this object is accomplished in that the generic video camera further includes a projection area disposed with respect to the first objective such that light guided through the first objective is imaged onto the projection area, as well as a second objective disposed with respect to the projection area and to the semiconductor sensor field such that light from the projection area is imaged onto the semiconductor sensor field.

In addition, the projection area is movable with respect to the image formed thereon. Specifically the projection area may be rotated about an axis passing through the projection area, the projection area may be reciprocated or the projection area may be moved with a rotational movement combined with a linear movement to eccentrically rotate the projection area with a tumbling movement. The speed movement of the projection area is selected so high that any structure of the projection area image surface or any dust particles or other impurities on the projection area image surface can no longer be resolved on an image formed onto and being read out from the semiconductor field.

Alternately, or additionally, the projection area image surface may be encapsulated by front and back clear glass filters with a thickness selected for moving dust particles and other small impurities away from the well-focused image formed on the projection area image surface. Accordingly, the dust particles and impurities are out of focus and no longer imaged in a disturbing manner onto the semiconductor sensor field.

By this two-step imaging, in which the first objective is preferably film optics forming a larger image format, e.g. 25 mm by 19 mm and the second objective can be the objective of a conventional video camera forming a smaller image format onto the semiconductor field, a low depth of focus in the semiconductor field image can be achieved as desired.

Only by this measure, it is made possible that video cameras are employed in the field of the film industry not only for test and control purposes, that is as an auxiliary means, but in the future take the tasks, which have been taken by film cameras heretofore. The invention makes available the combination of elements of the field of the film technique and elements of the video field: the use of cheap and repeatedly usable recording medium as well as the low weight of the video camera, the selection of many different optics usual in the film industry with simultaneous achieving the desired lack of depth of focus of the film camera. It is quasi a synergistic association of the formats film and video separated up to now.

In a preferred embodiment, the projection area is a mat surface, especially a mat glass disk. Insofar as the surface is transparently formed, this offers the possibility of disposing the first objective such that light from the scene to be picked up is imaged onto the front side of the projection area, and the second objective is disposed such that light from the backside of the projection area is imaged onto the semiconductor sensor field. This results in a compact construction of the video camera and minimization of the optical elements. The latter is especially preferred because by each optical element, losses, for example in the light intensity or the focusing, are introduced.

For the first objective, preferably, film optics are used, especially optics from the 35 mm range, wherein then the projection area is preferably rectangular and has a width of e.g. 25 mm. By this adaptation of the projection area to the optics used for the first objective, optimum obtaining the lack of depth of focus achieved by the film objective is allowed. A projection area having a width of e.g. 25 mm is really huge compared to the area of a conventional CCD chip of a video camera. With respect to the second objective, the essential requirement is that it has to be designed such that the light from the projection area is well-focused imaged onto the semiconductor sensor field. Since the actual optical operation is already done by the first objective, therefore, the second objective can be of distinctly less quality compared to the first objective. Especially, the second objective can be optimized with respect to its actual task, namely the well-focused imaging of the image on the projection area onto the semiconductor sensor field. Due to this specialization of the scope of tasks of the second objective, these can be realized with low cost.

Usually, the video camera includes a recording mechanism, by which the semiconductor sensor field can be read out and the read-out data can be stored.

Preferably, the projection area is encapsulated, since dust and small impurities depositing on the projection area lie exactly on the focal plane in the present invention, and thus would always be imaged well-focused onto the semiconductor sensor field. For this purpose, clear filter glass is especially suited, which is disposed in front of and behind the projection area. By appropriate selection of the distance from the projection area, it can be ensured that impurities depositing on the filter glass are no longer imaged in disturbing manner onto the semiconductor sensor field.

In order that the structure of the ground glass disk, i.e. the structure used for achieving the matting, does not affect the imaging characteristics of a video camera according to the invention or of an adapter according to the invention in disturbing manner, but especially also in order to let "disappear" dust particles sticking on the ground glass disk or on the encapsulation of the ground glass disk, in a preferred development, means are provided to move the ground glass disk, i.e. the projection area, e.g. to reciprocate or to rotate it about an axis through the projection area. Therein, the speed of movement is to be selected so high that the structure of the ground glass disk or dust particles on the ground glass disk or the encapsulation, respectively, can no longer be resolved in the image being able to be read out from the semiconductor sensor field.

The above object is also accomplished in that the initially mentioned adapter further includes a projection area disposed with respect to the objective such that light guided through the objective is imaged onto the projection area, wherein the adapter housing has means for attaching the adapter to the video camera such that the objective of the video camera is able to be directed to the projection area so that the image can be recorded on the projection area by the video camera.

As already stated above, the requirements to the second objective can be relatively low, so that conventional video objectives can be employed for that. Preferably, the adapter is formed such that its objective can be easily exchanged.

Thereby it is achieved that an inexpensive video camera mutates to a high-quality recording apparatus by use of such an adapter, wherein the results of recording with respect to depth of focus are comparable to that of known film cameras. In case that the projection area cannot be well-focused imaged onto the semiconductor sensor field with the normal objective of the conventional video camera, it can be necessary to replace it by a macroobjective. Alternatively, a macro effect can be achieved by connecting another objective in series with the normal objective. The term objective of the video camera as is used in the application is to also include this combination.

Preferably, the projection area has no marks or markings. As already above discussed in context with the video camera according to the invention, the projection area is preferably a mat surface, especially a mat glass disk, so that the objective of the adapter can be disposed such that light from the scene to be picked up is imaged onto the front side or the projection area, wherein the means for attaching the adapter to the video camera is designed such that the objective of the video camera is able to be directed to the backside of the projection area.

It is understood that for the objectives of the adapter, all of the formats known from the film industry are considered, but wherein with respect to the excessive choice, "35 mm optics", i.e. optics for imaging on 35 mm wide film strips, of very different focal lengths are preferred.

As already set out in context with the video camera according to the invention, the projection area is preferably encapsulated between two transparent disks in order to prevent the imaging of impurities on the projection area onto the semiconductor sensor field, and/or means is provided for moving the projection area, especially for rotating it about an axis through the projection area. Further advantageous embodiments result from the dependent claims.

BRIEF DESCRIPTION OF THE SEVERAL VIEWS OF THE DRAWINGS

In the following, an embodiment is described more detailed with reference to the attached drawings, wherein.

DETAILED DESCRIPTION OF THE INVENTION

Figure 1:
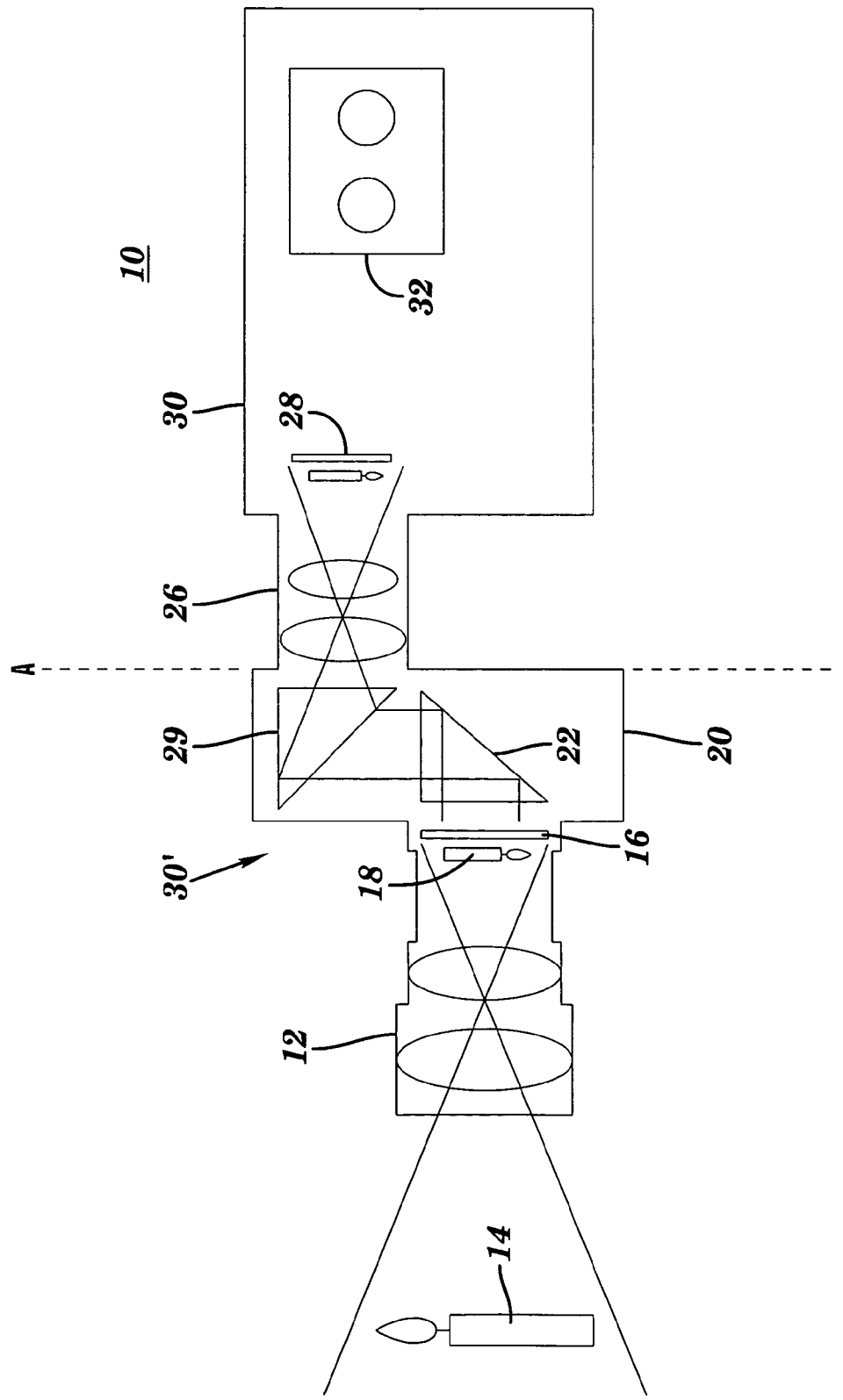
FIG. 1 shows in sectional schematic view the construction of a video camera according to the invention; and, FIG. 2 shows a belt drive for rotating a roundly formed ground glass disk.

The video camera 10 according to the invention, illustrated in FIG. 1, includes a first objective 12, by which a scene 14 to be recorded can be well-focused imaged on a mat glass disk 16. The mat glass disk 16 has no marks or markings. Its size is adapted to the used objective 12. For example, in use of 35 mm optics as the objective 12, the mat glass disk 16 has a width of 35 mm. With regard to the size of the imaging effected on the mat glass disk 16 by the first objective 12, see below, this one should preferably have a size of at least 25 mm×19 mm in case of use of 35 mm optics. However, this first objective 12 can be optics of any format known from the film industry. However, as already mentioned, due to the great choice, 35 mm optics are preferred. The mat glass disk 16 has a front side showing an image 18 of the scene 14 to be imaged. The image 18 is turned upside down with respect to the original. The light passing through the mat glass surface 16 is guided through a prism block 20 in order to reerect the mirror-inverted image 18 turned upside down. In FIG. 1, a first 22 and a second prism 24 are schematically indicated in the prism block. For one skilled in the art, it is evident that the object of the prism block 20 can also be effected by other constellations, above all also in electronic manner.

Instead of the optical erection of the image 18 by the prism block 20, shown here, an erection in electronic manner is also considered. The last mentioned measure is preferred since transmission of the light through the mat glass disk as well as the prisms 22 and 24 is associated with lightness and quality lost.

The light exiting the prism 24 passes through a second objective 26, thereby imaging the original 14, finally again turned upside down, on a semiconductor sensor field 28, for example a CCD (charged coupled device). In the housing 30 of the video camera, as schematically illustrated in FIG. 1, further a recording mechanism 32 is accommodated, by which the semiconductor sensor field 28 can be read out and the read out data can be stored.

With regard to the adapter according to the invention, the adapter includes the elements represented on the left hand of the line AA in FIG. 1, wherein again especially preferred the prism block 20 can be omitted. On the right hand of the line AA in FIG. 1, with regard to the adapter according to the invention, a customary video camera is represented. The objective 12, the projection area 16 as well as the prism block 20 are accommodated in an adapter housing 30'.

In an embodiment, not shown, the projection area has an area-like formed front side, while the backside is curved. This curve acts as an optical lens. According to the invention, in this design, this optical lens is to be considered as a part of the second objective, by which the image on an area-like formed backside of the projection area—presently to be assumed fictitious—is imaged onto the semiconductor sensor field.

Preferably, the projection area is further encapsulated between a clear filter glass disposed in front of the projection area and one disposed behind it.

In order that the structure of the ground glass disk, i.e. the structure used for achieving the matting, does not influence the imaging characteristics of a video camera according to the invention or of an adapter according to the invention in disturbing manner, but especially also to let "disappear" dust particles sticking on the ground glass disk or the encapsulation of the ground glass disk, means can be provided for moving the ground glass disk, i.e. the projection area, e.g. to reciprocate and/or to rotate it about an axis through the projection area. Therein, the speed of movement is to be selected so high that the structure of the ground glass disk or dust particles on the ground glass disk or the encapsulation, respectively, can no longer be resolved in the image being able to be read out from the semiconductor field.

Figure 2:
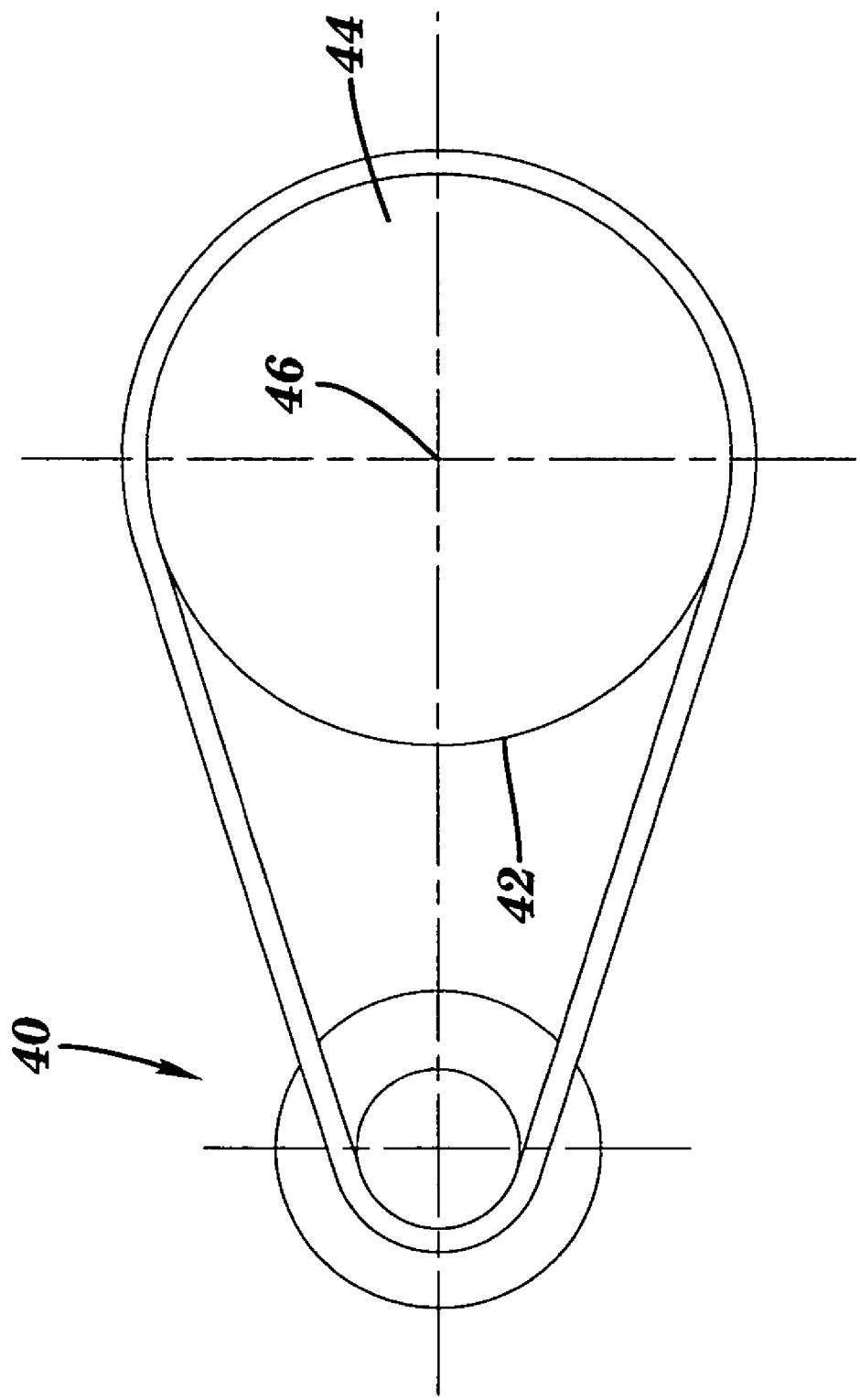

In a preferred realization, shown in FIG. 2, the rotation of the ground glass disk is effected by a belt drive 40, which engages the circumferential surface 42 of a roundly formed ground glass disk 44. Since in an exclusive rotational movement, the point of the ground glass disk, which is on the rotational axis 46, is not moved, and thereby the problem of imaging the structure or dust particles continues to exist there, it is even more preferred if the rotational movement is combined with a linear movement, so that as a whole a kind of "tumbling" movement or an eccentric rotational movement occurs.

In preferred embodiments, the rotational speed is between 1 and 10 revolutions per second, preferably between 3 and 7 revolutions per second, and even more preferred e.g. 5 revolutions per second.

The invention claimed is:

1. An adaptor for attaching to a video camera for configuring the video camera to capture a low depth of focus video image of a scene comprising:
   a first objective lens for receiving light from the scene and for forming a first image of the scene;
   a projection area including a transparently formed mat surface positioned to receive said first image thereon, wherein the projection area is movably supported with respect to the first image; and,
   a device configured to eccentrically rotate the projection area with respect to the first image.

2. The adaptor of claim 1, wherein the first image is a mirror image of the scene, further comprising means for mirror inverting the first image.

3. The adaptor of claim 1 further comprising an adaptor housing for supporting the projection area, the device configured to eccentrically rotate the projection area, and the first objective lens.

4. The adaptor of claim 1 wherein said first image is formed with an image format having a substantially rectangular shape with a width dimension in the range of 25 to 35 mm and a height dimension in the range of 19 to 35 mm.

5. The adaptor of claim 1 wherein the device configured to eccentrically rotate the projection area with respect to the first image is further configured to linearly reciprocate the projection area with respect to the first image.

6. The adaptor of claim 5, wherein said first image is formed with an image format having a substantially rectangular shape with at least one dimension in the range of 19 to 35 mm.

7. The adaptor of claim 1 wherein the projection area comprises a round glass disk having an axial center and a circumferential surface and further wherein the device configured to eccentrically rotate the projection area is configured to rotate the glass disk about a rotation axis other than the axial center.

8. The adaptor of claim 7 wherein the device configured to eccentrically rotate the projection area is a belt drive.

9. The adaptor of claim 7 wherein the device configured to eccentrically rotate the glass disk rotates the glass disk with a rotational speed of between 1 and 10 revolutions per second.

10. An adaptor for attaching to a video camera for configuring the video camera to capture a low depth of focus video image of a scene comprising:
    a first objective lens for receiving light from the scene and for forming a first image of the scene;
    a Projection area including a transparently formed mat surface positioned to receive said first image thereon, wherein the projection area is movably supported with respect to the first image; and,
    a device configured to rotate the projection are about a rotation axis (46) passing through the mat surface and to linearly reciprocate the projection area with respect to the first image.

11. The adaptor of claim 10 wherein the projection area comprises a round glass disk having an axial corner and a circumferential surface and the device configured to rotate the glass disk comprises a belt drive configured to engage the circumferential surface.

12. An adaptor for attaching to a video camera and allowing the video camera to record a low depth of focus video image of a scene onto a semiconductor sensor field comprising:
    a first objective lens (12) for receiving light from the scene and forming a first image of the scene;
    a projection area comprising a transparently formed mat surface positioned to receive said first image (18) of the scene thereon;
    a pair of substantially transparent glass elements disposed one between the first objective lens and the mat surface and one between the mat surface and the semiconductor sensor field to encapsulate the mat surface; and, wherein each transparent glass element is positioned at an appropriate distance from the mat surface that it can be ensured that impurities deposited on either of the pair of substantially transparent glass elements are not imaged onto the semiconductor sensor field in a disturbing manner.

13. The adapter of claim 12 wherein the first image is a mirror image of the scene, further comprising means for mirror inverting the first image.

14. The adapter of claim 12 further comprising means for moving the projection area with respect to the first image.

15. The adaptor of claim 14 wherein the means for moving the projection area comprises a device configured to linearly reciprocate the projection area with respect to the first image.

16. The adaptor of claim 14 wherein the means for moving the projection area and the comprises a device configured to rotate the projection area about an axis passing though the mat surface.

17. The adaptor of claim 14 wherein the means for moving the projection area comprises a device configured to eccentrically rotate the projection area.

18. The adapter of claim 14 wherein the means for moving the projection area comprises a device configured to provide a tumbling movement to the projection area.

19. The adaptor of claim 14 wherein the projection area comprises a round glass disk having an axial center and a circumferential surface and further wherein the means for moving the projection area comprises a device (40) configured to rotate the glass disk about a rotation axis other than the axial center.

20. The adaptor of claim 19 wherein the device configured to rotate the glass disk comprises a belt drive.

21. The adapter of claim 12 wherein said first image is formed with an image format having a substantially rectangular shape with at least one dimension in the range of 19 to 35 mm.

22. The adapter of claim 12 wherein said first image is formed with an image format having a substantially rectangular shape with a width dimension in the range of 25 to 35 mm and a height dimension in the range of 19 to 35 mm.

23. A method for capturing a low depth of focus video image of a scene comprising the steps of:

forming a first image of the scene onto a transparently formed mat surface with said first image having a first image format;

forming a second image of said first image onto a semiconductor sensor field with said second image having a second image format and with said second image format being formed with a smaller area than said first image format;

reading out and storing the second image with a video recording mechanism configured to communicate with the semiconductor sensor field; and, rotating the mat surface about a rotation axis passing through the mat surface.

24. The method of claim 23 wherein the mat surface is rotated with respect to the first image with a speed of rotation that is so high that a structure of the mat surface can no longer be resolved in the second image being read out from the semiconductor sensor field.

25. The method of claim 23 further comprising the step of linearly reciprocating the mat surface with respect to the first image comprises.

26. A method for capturing a low depth of focus video image of a scene comprising the steps of:

forming a first image of the scene onto a transparently formed mat surface with said first image having a first image format;

forming a second image of said first image onto a semiconductor sensor field with said second image having a second image format and with said second image format being formed with a smaller area than said first image format;

reading out and storing the second image with a video recording mechanism configured to communicate with die semiconductor sensor field;

moving the mat surface with resurrect to the first image; and encapsulating the mat surface between a first substantially transparent glass element disposed between the transparently formed mat surface and a first objective lens used to form the first image and a second substantially transparent glass element disposed between the mat surface and the semiconductor sensor field, wherein each transparent glass element is positioned at an appropriate distance from the mat surface that it can be ensured that impurities deposited cm either of the transparent glass elements are not imaged onto the semiconductor sensor field in a disturbing manner.

27. The method of claim 26 further comprises the step of moving the mat surface with a speed of movement that is so high that a structure of the mat surface can no longer be resolved in the second image being read out from the semiconductor sensor field.

28. The method of claim 26 wherein the step of forming the first image forms a mirror image of the scene; further comprising the step of minor inverting the first image prior to form the second image.

29. The method of claim 26 wherein the step of forming the first image includes forming the first image with a substantially rectangular shape having at least one dimension in the range of 19 to 35 mm.

30. The video camera of claim 26 wherein, the step of forming the first image includes forming the first image with a substantially rectangular shape having a width dimension in the range of 25 to 35 mm and a height dimension in the range of 19 to 35 mm.

* * * * *